March 11, 1969  R. J. MURPHY  3,432,163
TWISTING AND TUMBLING BELT

Filed Jan. 11, 1968  Sheet 1 of 4

INVENTOR
RAYMOND J. MURPHY
BY
*Max E. Shirk*
ATTORNEY

INVENTOR
RAYMOND J. MURPHY
BY Max E. Shirk
ATTORNEY

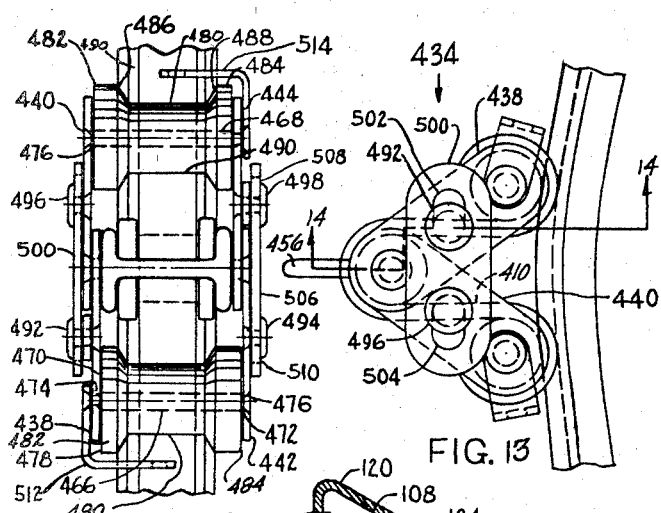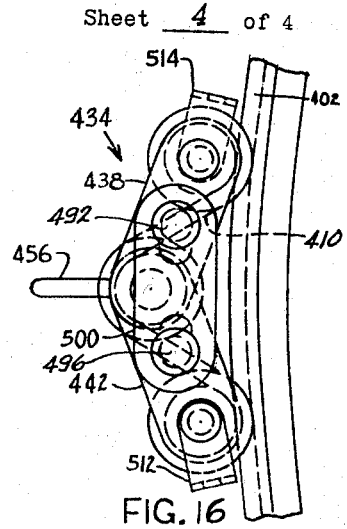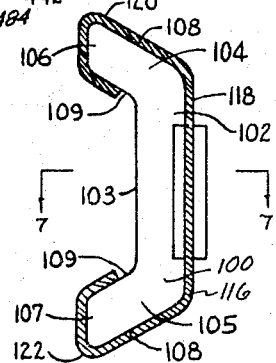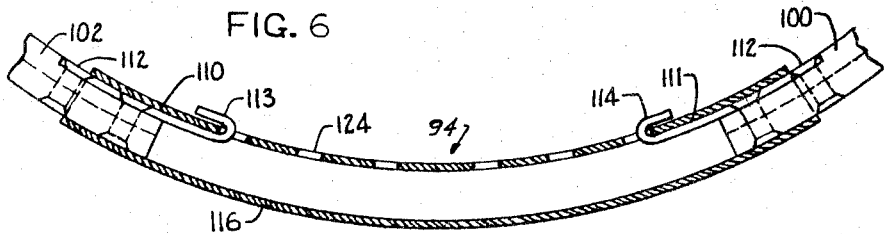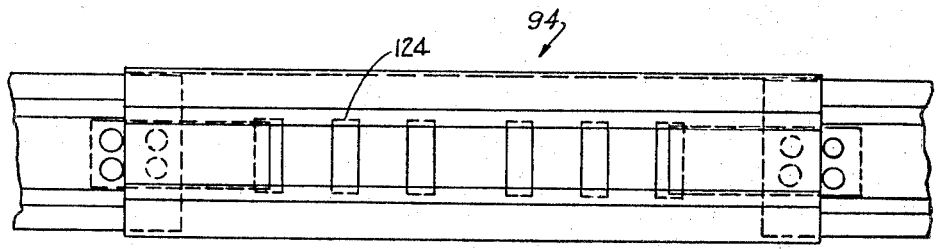

United States Patent Office 3,432,163
Patented Mar. 11, 1969

3,432,163
TWISTING AND TUMBLING BELT
Raymond J. Murphy, 20412 Craimer Lane,
Huntington Beach, Calif. 92646
Continuation-in-part of application Ser. No. 516,937,
Dec. 28, 1965. This application Jan. 11, 1968, Ser.
No. 697,162
U.S. Cl. 272—60        9 Claims
Int. Cl. A63b 1/00, 13/00, 5/00

ABSTRACT OF THE DISCLOSURE

A tumbling and twisting belt having a belt track adapted to encompass a tumbler's waist and a pair of roller assemblies connected to the track for movement therearound, includes divergent, roller-engaging flanges preventing relative axial movement between the roller assemblies and the track. Cable means connect the roller assemblies together to keep them spaced 180 degrees apart.

CROSS-REFERENCE TO RELATED APPLICATION

This application is a continuation-in-part of copending application Ser. No. 516,937, filed Dec. 28, 1965, now patent No. 3,372,926.

BACKGROUND OF THE INVENTION

The background of the invention is set forth in two parts:

Field of the invention

The present invention relates generally to the field of twisting and tumbling belts and more particularly to the improvement in such belts of means preventing relative movement between a waist-encompassing belt track and connecting means for connecting said belt track to an elevated support without restricting rotation of said connecting means around said belt track.

Description of the prior art

Reference may be had to the file of said copending application Ser. No. 516,937 for United States Patents Nos. 2,496,748 and 3,085,357 which disclose prior art twisting and tumbling belts.

The belt disclosed in Patent No. 2,496,748 comprises a pair of concentrically positioned rings each having a half groove in which ball bearings may be inserted so that the rings may be connected together for rotation with respect to each other. The inner ring is connected to an adjustable waistband by adjustable, radially extending straps. The outer ring may be connected to a pair of cables which are trained through overhead pulleys for operation by an instructor to support a student performing acrobatics, if the student appears to be heading for a fall.

The belt disclosed in Patent No. 3,085,357 comprises an outer belt and an inner belt which encircle the student's waist in concentric relation. An outwardly facing channel is formed on the inner belt forming bearing surfaces for the outer belt which is narrower than the channel. Relative rotation between the belts is necessary and the outer belt may include a nylon layer so that it slips more easily relative to the inner belt.

SUMMARY OF THE INVENTION

In view of the foregoing factors and conditions characteristic of tumbling belts, it is a primary object of the present invention to provide a new and useful tumbling belt having an economical and simple construction facilitating the placing of the belt about a student's waist.

Another object of the present invention is to provide a tumbling belt which includes roller means adapted to travel about an elliptical member encompassing a student's waist.

Yet another object of the present invention is to provide a tumbling belt which includes means preventing relative axial movement between a belt track encompassing a student's waist and a mounting means mounting a connecting means on the belt track for rotation therearound.

According to the present invention, a tumbling and twisting belt is provided. The belt includes a belt track adapted to encompass a tumbler's waist and a pair of roller assemblies connected to the track for movement therearound. The belt track includes divergent, roller-engaging flanges for preventing relative axial movement between the roller assemblies and the track.

Cable means connect the roller assemblies together to keep them spaced 180 degrees apart on the belt track.

The belt track includes two opposed free ends which are interconnected by a bridge which is so constructed and arranged as to permit the roller assemblies to move across the bridge.

The roller assemblies are swivelly connected to cables so that the belt track may be supported above a man-supporting surface and have 3 degrees of freedom of motion.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIGURE 6 is a sectional view taken along line 6—6 of FIGURE 5;

FIGURE 7 is a sectional view taken along line 7—7 of FIGURE 6;

FIGURE 8 is a sectional view taken along line 8—8 of FIGURE 5;

FIGURE 13 is a top plan view of a roller assembly forming part of the present invention;

FIGURE 14 is a sectional view taken along line 14—14 of FIGURE 13;

FIGURE 15 is a side elevational view of the roller assembly of FIGURE 13; and

FIGURE 16 is a top plan view showing the roller assembly of FIGURE 13 in an expanded position.

DESCRIPTION OF THE PREFERRED EMBODIMENTS

Figure 1:
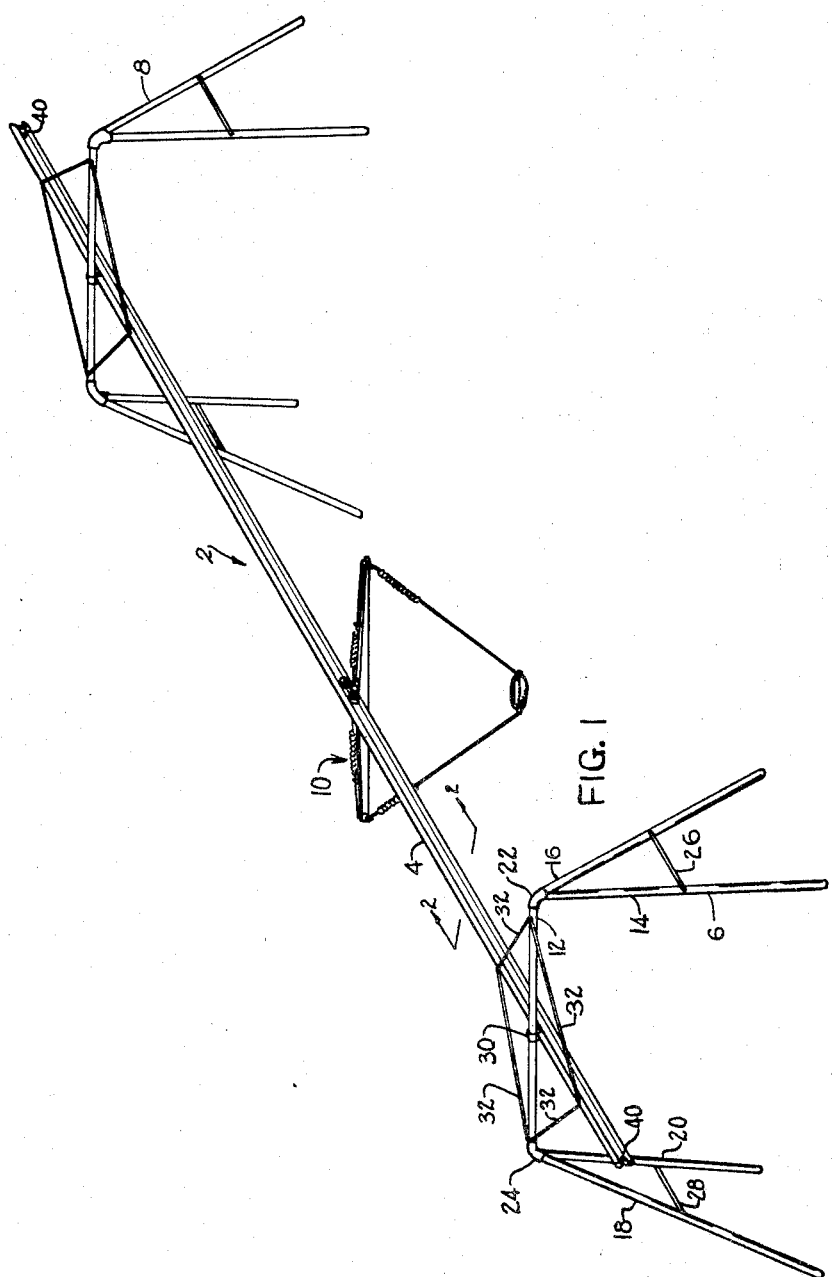
FIGURE 1 is a perspective view of a tumbling device constructed in accordance with and embodying the present invention.
Figure 11:
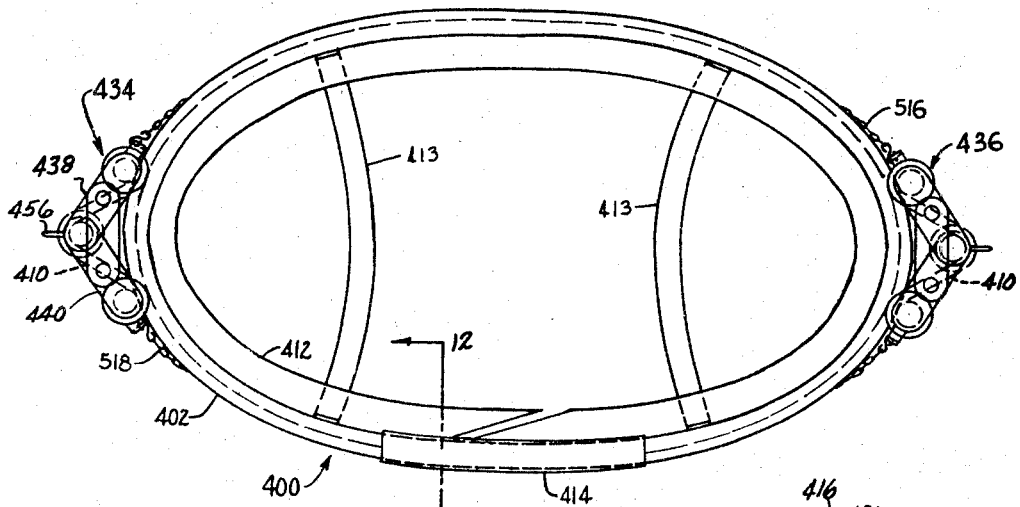
FIGURE 11 is a top plan view of a modified form of tumbling and twisting belt constructed in accordance with and embodying the present invention.
Figure 12:
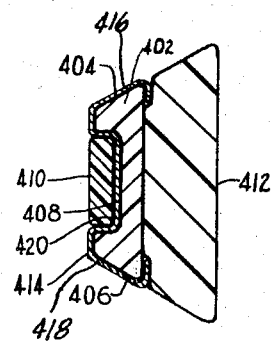
FIGURE 12 is a sectional view taken along line 12—12 of FIGURE 11.

Referring now in more detail and by reference characters to the drawings, which illustrate practical embodiments of the present invention, 2 designates a gymnastic tumbling device comprising a track 4 which is supported inwardly from its ends by two A-frames 6, 8, and is adapted to guide and support a tumbling harness 10. The A-frames 6, 8, are similar to the type used for so-called children's backyard swing sets, and inasmuch as they are identical to one another, it will be sufficient for purposes of the present disclosure to describe only the A-frame 6. As will be seen by reference to FIGURE 1, A-frame 6 includes a horizontal cross-member 12 which is supported at its ends by downwardly and outwardly diverging legs 14, 16, and 18, 20, legs 14, 16, and 18, 20, being connected at their upper ends to the ends of the cross-member 12 by socket-fittings 22, 24, or any other suitable device. Interconnecting legs 14, 16, and 18, 20, intermediate their ends to lend rigidity to the structure are cross-bars 26, 28, respectively.

Rigidly fastened to the underside of the horizontal cross-members 12 preferably by means of straps 30 is track 4 which is cantilevered outwardly beyond cross-members 12 and is held rigid with respect thereto by braces 32. Track 4 includes a tubular member 34 having a longitudinally extending flange 36 spot welded or otherwise securely fastened to the outer surface thereof. Flange 36 extends downwardly from tubular member 34 and is turned upwardly along its lower margin in the provision of a rail-forming way or groove 38. Fastened to flange 36 at its ends and projecting over groove 38 are rubber bumper cushions 40.

Figure 2:
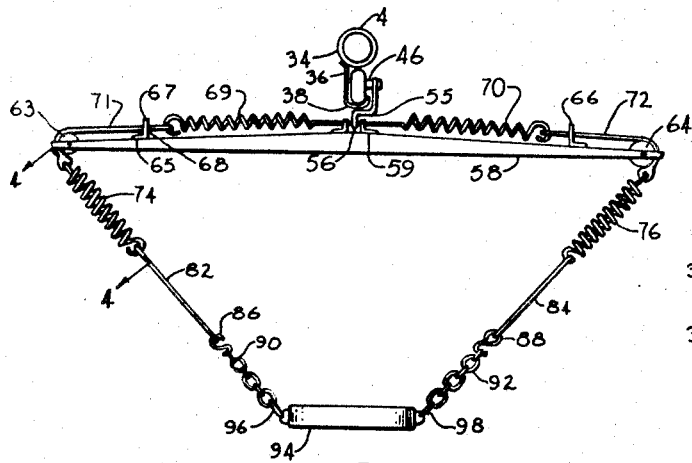
FIGURE 2 is a sectional view taken along line 2—2 of FIGURE 1.
Figure 3:
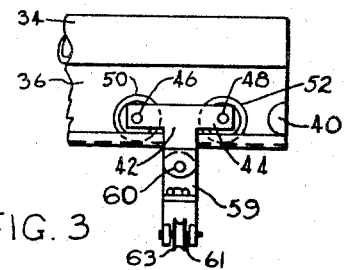
FIGURE 3 is a side elevational view of a carriage and cross-bar forming part of the present invention.
Figure 4:
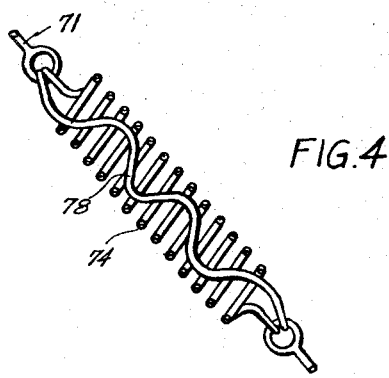
FIGURE 4 is an enlarged fragmentary sectional view taken along line 4—4 of FIGURE 2.

Provided for longitudinal displacement on track 4 is tumbling harness 10 including a carriage 42 having a side plate 44 to which spindles 46, 48 are rigidly affixed. Rotatably mounted on spindles 46, 48 are carriage wheels 50, 52 respectively, the outer peripheries of which are contoured to fit the curve of groove 38. Carriage wheels 50, 52 are preferably molded from a synthetic resin having a low coefficient of friction and inherent corrosion resistant properties, but it should be noted the choice of materials is not critical and many other materials would serve satisfactorily. As will be seen by reference to FIGURES 2 and 3, side plate 44 is downwardly provided with an angulated retainer portion 55 which extends beneath the lower surface of flange 36 so that carriage 42 cannot be lifted upwardly out of groove 38. Retainer portion 55 integrally merges into a downwardly projecting tab 56. Pivotally carried by carriage 42 is a transversely extending cross-bar 58 which is preferably constructed from a somewhat resilient material such as hickory wood, spring steel or a suitable synthetic resin and is centrally provided on its top surface with a bifurcated bracket 59 into which downwardly projecting tab 56 fits, bracket 59 and tab 56 being swingably fastened one to the other by means of a pin 60. At its ends, cross-bar 58 is provided with rotatable sheaves 63, 64. Rigidly secured to the upper face of cross-bar 58 intermediate bracket 59 and sheaves 63, 64 are stops 65, 66, each having an upwardly projecting flange 67 provided with an aperture 68. As will be seen by reference to FIGURE 2, the furcations of bracket 59 securely engage the ends of helical secondary springs 69, 70, which extend over the upper surface of cross-bar 58 and terminate in inwardly spaced relation to stops 65, 66. Springs 69, 70 have relatively low spring rates and readily extend to stops 65, 66 upon the application of a few pounds' force. At their opposite ends springs 69, 70 are secured to intermediate cables 71, 72, which extend through apertures 68 in stops 65, 66, and over sheaves 63, 64, beyond which they are connected to helical tension springs 74, 76, each possessing a considerably greater spring rate than secondary springs 69, 70. The respective ends of each of springs 74, 76 are tied together by internally extending slack cables 78, 80, as best seen in FIGURE 4, to prevent such springs from overextending. In this connection, it has been found by actual experiment that slack cables 78, 80 should be adjusted so that springs 74, 76 extend a maximum of 18 inches when completely supporting a 200 pound gymnast in the manner presently to be described. The lower ends of springs 74, 76 are securely fastened to the upper ends of ropes 82, 84, preferably wound from a synthetic resin material having a low coefficient of friction and high tensile strength. So-called ski rope has been found to be ideally suited for the purposes of the present invention. At their lower ends, ropes 82, 84 are provided with S-hooks 86, 88, which engage preselected links of chains 90, 92, which are, in turn, connected at their lower ends to a tumbling and twisting belt 94 by means of swivel-type harness snaps 96, 98, as will presently be described in greater detail.

Figure 5:
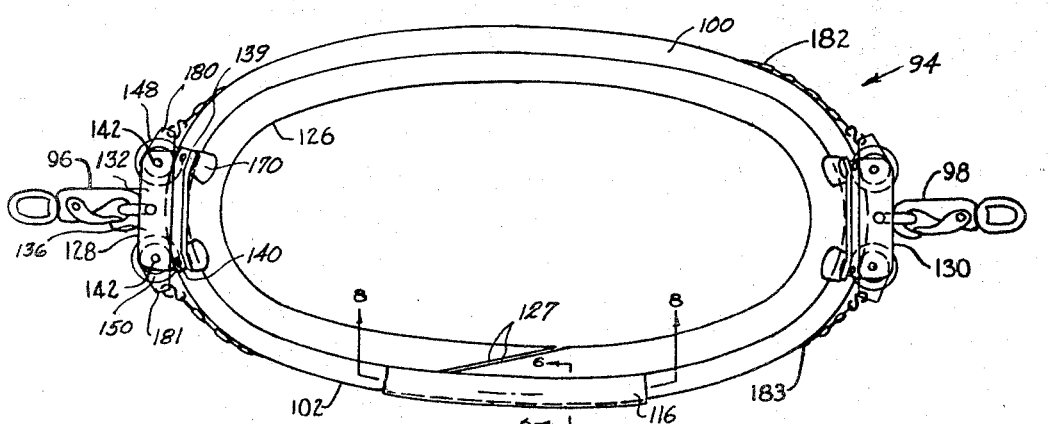
FIGURE 5 is a top plan view of a tumbling and twisting belt forming part of the present invention.

Tumbling and twisting belt 94 is slightly pliable but nevertheless always assumes an oval or somewhat elliptical configuration illustrated in FIGURE 5 when free of distending forces. Such a configuration conforms to the peripheral shape of the human waist. Belt 94 includes an outwardly presented track 100 having opposed ends which are spaced approximately five inches apart when no distending forces are applied thereto. Preferably, tack 100 is molded from a somewhat rigid but slightly flexible synthetic resin having a low coefficient of friction, such as nylon, and it further includes a center portion 102 having an outwardly presented race 103. The center portion integrally merges into upper and lower outwardly diverging flanges 104, 105, which, in turn, terminate at substantially planar vertical outer edges 106, 107, all as best seen in FIGURE 6. The upwardly and outwardly presented surfaces of each of flanges 104, 105 form races 108, 109 thereon. The inwardly presented face of center portion 102 is centrally recessed adjacent the opposed ends of track 100 so as to accommodate the shank ends of steel fasteners 110, 111, which are securely affixed therein by means of countersunk rivets 112. As will be seen by reference to FIGURE 7, the exposed surfaces of the shanks of fasteners 110, 111 are flush with the inwardly presented surface of center portion 102 and are arcuately curved to conform to the oval contour of track 100. Fasteners 110, 111 are preferably fabricated from spring steel and extend beyond the end margins of track 100 where they are curved inwardly toward the center of belt 94 in the provision of hooks 113, 114.

Interconnecting the ends of track 100 is a bridge 116 which is preferably formed from stainless steel bent to match the arcuate contour of track 100 at the points of connection. Bridge 116 integrally includes a center portion 118 which abuts against the inwardly presented face of center portion 102 of track 100. Center portion 118 integrally merges into upper and lower outwardly diverging flanges 120, 122, which wrap around into embracive engagement with races 108, 109, and outer edges 106, 107 of flanges 104, 105, as best seen in FIGURE 6. Center portion 118 of bridge 116 is provided with a plurality of arcuately spaced rectangular apertures 124 which accept hooks 113, 114 of fasteners 110, 111. Thus, the size of tumbling belt 94 can be varied by telescopically sliding track 100 within bridge 116 and engaging various combinations of apertures 124 with hooks 113, 114.

Adhesively or otherwise secured to the inwardly presented face of center portion 102 of track 100 is a peripherally extending inner cushion 126 formed from a soft material such as polyvinyl foam. Cushion 126, of course, remains free of bridge 116 and in juxtaposition thereto its ends are diagonally cut, as shown at 127 in FIGURE 5, so as to form complementary overlapping end surfaces which cushion the wearer irrespective of the particular belt adjustment employed.

Figures 9, 10:
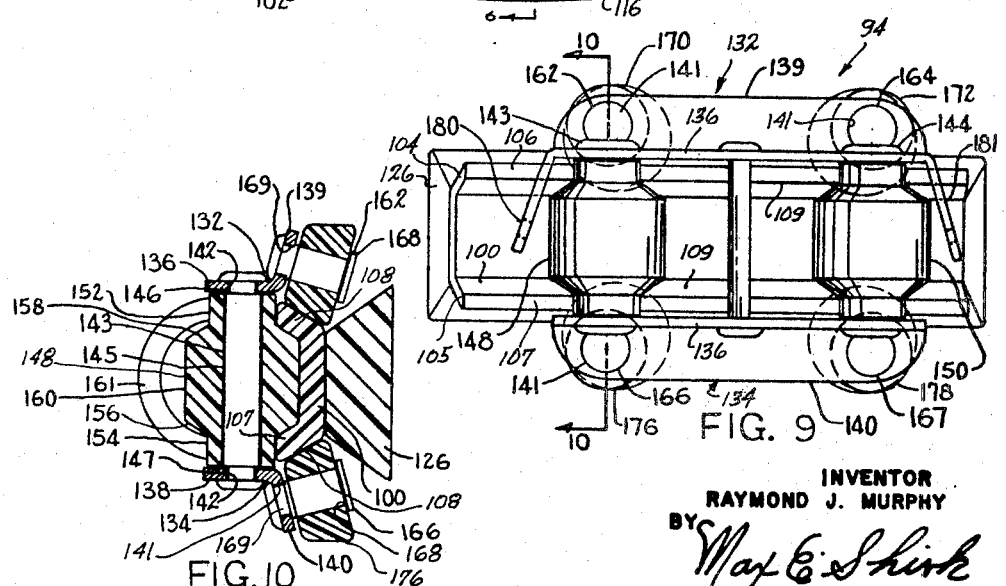
FIGURE 9 is an elevational view of a roller assembly forming part of the present invention.
FIGURE 10 is a sectional view taken along line 10—10 of FIGURE 9.

Mounted on track 100 for movement therearound as well as across bridge 116 are opposed support runners or roller assemblies 128, 130, which are in turn connected to chains 90, 92 by means of harness snaps 96, 98 so that belt 94 is suspended from cross-bar 58. Inasmuch as roller assemblies 128, 130 are identical in design and manufacture, only roller assembly 128 will be described herein in detail. Roller assembly 128 includes upper and lower connecting members 132, 134 (FIGURE 10), which are bent in the provision of horizontal webs 136, 138, and outwardly diverging angulated flanges 139, 140. The outer end corners of angulated flanges 139, 140 are canted slightly inwardly, where they are provided with apertures 141, while the webs 136, 138 are each provided with spaced apertures 142, all for purposes presently more fully appearing.

Interconnecting parallel horizontal webs 136, 138, in close proximity to their ends, are vertically extending pintles 143, 144, each having a diametrally enlarged cylindrical center portion 145 and reduced end portions 146, 147, which fit through apertures 142 and are peened over onto the outer faces of webs 136, 138 so as to hold connecting members 132, 134 rigidly in spaced relation to one another. Enlarged center portions 145 of pintles 143, 144 rotatably carry vertical spools 148, 150, having squared-off end surfaces which rotatably abut against the inwardly presented surfaces of webs 136, 138. Spools 148, 150 are further provided at their ends with diametrally reduced end sections 152, 154, which inwardly merge into outwardly tapered shoulders 158, 156, respectively, which, in turn, terminate at a diametrally enlarged center portion 160. As will be seen by reference to FIGURE 10, the cylindrical surface of center portion 160 engages race 103 of center portion 102 forming part of track 100 while tapered shoulders 158, 156 engage races 109 of diverging flanges 104, 105, respectively. Diametrally reduced end sections 152, 154 engage vertical outer edges 106, 107 of track 100 in close proximity to connecting members 132, 134. Intermediate pintles 143, 144, webs 136, 138 are interconnected by a D-ring 161 which receives harness snap 96.

Securely fitted into apertures 141 located in the inwardly canted ends of angulated flanges 139, 140 are pins 162, 164, and 166, 167, respectively, the axes of which coverage toward the center of belt 94. Each of pins 162, 164, 166, 167 is integrally provided at its free end with an outwardly projecting flange 168 and at its opposite end is turned down in the provision of a diametrally reduced end portion 169. End portions 169 fit into apertures 141 and are peened over beyond such apertures so as to rigidly secure pins 162, 164, 166, 167 to angulated flanges 139, 140. Pins 162, 164, 166, 167 carry tapered guide rollers 170, 172, 176, 178, respectively, which engage races 108 of flanges 104, 105, so that such flanges are snugly, but movably, interposed between tapered shoulders 156, 158 of spools 148, 150 and guide rollers 170, 172, 176, 178. Guide rollers 170, 172, 176, 178 are securely but rotatably held to their respective pins 162, 164, 166, 167 by flanges 168.

Inasmuch as track 100 is embraced, so to speak, between spools 148, 150 and guide rollers 170, 172, 176, 178, it is impossible to laterally withdraw roller assemblies 128, 130 from track 100, but assemblies 128, 130 are nevertheless free to move around the periphery of track 100 and across bridge 116. This arrangement prevents excessive deflection of track 100 by distributing the load over a relatively wide span thereof. Moreover, diverging flanges 104, 105 serve as self-centering devices and correct misalignment of roller assemblies 128, 130. It should be noted that it is preferable to mold spools 148, 150 and rollers 170, 172, 176, 178 from nylon or some other relatively hard synthetic resin having a low coefficient of friction. Finally, it should be further noted that roller assemblies 128, 130 are provided with outwardly projecting end tabs 180, 181, which are merely extensions of webs 136, tabs 180, 181 of roller assemblies 128, 130, being interconnected by an adjustable plastic rope, chain, or other suitable connecting means 182, 183, so that such roller assemblies will always remain in opposed relation to one another around the periphery of track 100.

In use, the gymnast enlarges tumbling and twisting belt 94 by releasing hooks 113, 114, and telescopically withdrawing track 100 slightly from bridge 116. He then slips enlarged belt 94 over his hips or torso until track 100 and cushion 126 encircle his waist, whereupon the opposed ends of track 100 are pressed toward one another within the bridge 116, thereby causing the curved ends of hooks 113, 114 to pass over rectangular apertures 124 somewhat similar to the manner in which a ratchet pawl passes over the teeth of a rack or cog wheel. To obtain a snug embracive fit, the gymnast should inhale and draw in his stomach muscles while hooks 113, 114 are brought into engagement with the particular combination of apertures 124 ultimately used during tumbling exercises. It should be noted that cushion 126 is interposed between track 100 and the gymnast's waist to provide a comfortable fit and to prevent unnecessary chafing, abrasions, and other discomforts. Cushion 126 further prevents the longitudinal margins of track 100 from digging into the user's ribs, a defect commonly associated with tumbling belts heretomore developed.

The gymnast then adjusts the height of belt 94 above the ground by judiciously selecting the links of chains 90, 92 into which S-hooks 86, 88 are hooked. When chains 90, 92 are properly adjusted, springs 74, 76 should barely support the gymnast above the ground when he bends over at his waist and attempts to place his palms on the ground. Of course, as the gymnast becomes more proficient, the effective portion of chains 90, 92 can be lengthened so as to provide the user greater freedom of movement. In this connection, it should be noted that cross-bar 58 is of such length in relation to springs 74, 76, ropes 82, 84, and chains 90, 92, that the latter components, when supporting the gymnast, will converge toward belt 94 at approximately 45 degrees to the vertical.

After drawing carriage 42 to one end of track 4 and into abutment with one of rubber bumper cushions 40, the gymnast is prepared to perform a variety of tumbling exercises. For example, he can, by taking a short forward run, jump upwardly and turn a flip or somersault in mid air by himself, without requiring the assistance of other persons to hold him aloft through the intervention of ropes, pulleys and the like, as has heretofore been necessary. With the tumbling device A, an instructor can give entire attention to instruction without being bothered by physically lifting and supporting the person being instructed. Moreover, tumbling device A makes it possible for tumbling to become a recreational or playtime activity which can be pursued by the individual at his own convenience and pleasure.

Inasmuch as ropes 82, 84 and chains 90, 92 diverge outwardly at approximately 45 degrees, sufficient freedom is provided for swinging the arms in any natural arc without striking such chains and ropes. Moreover, when the gymnast lifts off the ground to such a height that springs 74, 76 fully contract, much lighter springs 69, 70 will thereafter contract and take up any slack in ropes 82, 84. Of course, when harness 10 supports the full weight of the gymnast, springs 69, 70 engage stops 65, 66 and are thereby rendered ineffective.

Of course, while the gymnast is suspended in the air by means of harness 10, his body is virtually free for universal movement or, in other words, has 3 degrees of freedom of motion. More particularly, swivel harness snaps 96, 98 permit the belt and, of course, the gymnast too, to rotate about a horizontal axis while movable roller assemblies 128, 130 permit track 100 and the gymnast carried therein to rotate about an infinite number of axes in a vertical plane which is perpendicular to such horizontal axis. The user can tumble head-over-heels, so to speak, and at the same time twist about the longitudinal axes of his own torso. Thus, when the student gymnast becomes more proficient he can attempt such advanced tumbling exercises as a front flip with a half twist, full twists, and the like. If he loses his balance, harness 10 will arrest his fall and suspend him in mid air without suffering a broken neck or limb.

Referring now to FIGURES 11 through 16, a tumbling and twisting belt constituting a second embodiment of the present invention, generally designated 400, may be used with the tumbling harness 10. Belt 400 includes a track 402 formed preferably from a slightly flexible synthetic resin having a low coefficient of friction. Track 402 when free of distending forces assumes an oval shape which conforms substantially to the configuration of the human waist, and its free ends are spaced approximately five inches from one another. As will be seen by reference to FIGURE 12, track 402 is of a trapezoidal cross-sectional shape having upper and lower outwardly converging races 404, 406, and is relieved from its outwardly presented face in the provision of a peripheral rectangular groove 408 which accepts a continuous flexible band 410 also of rectangular cross-sectional shape, but having a perimetral size somewhat greater than track 402. Adhesively secured to the opposite face of track 402 is a peripherally extending inner cushion 412 formed from a soft material such as polyvinyl foam. Connected to the downwardly presented surface of track 402 and extending transversely across belt 400 are leg straps 413.

Interconnecting the free ends of track 402 is a bridge 414 which is preferably formed from a corrosion resistant metal and is arcuately bent to match the contour of track 402 at the points of connection. As will be seen by reference to FIGURE 13, bridge 414 possesses a cdoss-section configuration which enables it to fit telescopically over the ends of track 402. It further is provided with upper and lower outwardly converging races 416, 418, which form continuations of races 404, 406 of track 402. Interposed between races 416, 418 is a groove 420 which aligns with groove 408 and accommodates flexible band 410. It is apparent that the size of belt 400 can be quickly and conveniently altered to fit different individuals merely by sliding the ends of track 402 telescopically within bridge 414. In this connection, it should be noted that inner cushion 412 remains free of bridge 414 and in juxtaposition thereto is diagonally cut to form complementary overlapping end surfaces which cushion the wearer irrespective of the particular belt adjustment employed.

Movably held on track 402 in laterally projecting relation thereto by flexible band 410 are support runners or roller assemblies 434, 436. Inasmuch as roller assemblies 434, 436 are identical in design and manufacture, only roller assembly 434 will be described herein in detail. Roller assembly 434 includes upper scissor links 438, 440, which are located in upwardly spaced relation to lower scissor links 442, 444. Extending between upper links 438, 440 and lower links 442, 444 is a pintle 446 which is turned down at its ends in the formation of shoulders 448, 450 and diametrally reduced end portions 452, 454. End portions 452, 454, respectively, extend through upper links 438, 440 and lower links 442, 444, so as to pivotally join the same one to the other in the formation of scissor-like linkages. It should be noted that the outwardly presented ends of diametrally reduced end portions 452, 454 are countersunk into links 440, 444 so as to remain flush with the respective outer surfaces thereof while shoulders 448, 450 prevent links 438, 442 from sliding axially on pintle 446. Swingably secured to pintle 446 is a D-ring 456 having apertured ends which fit around the cylindrical surface of pintle 446 adjacent links 440, 444. D-ring 456 is adapted to engage a swivel-type harness snap such as harness snaps 96, 98 of tumbling device 2. Rotatably mounted on pintle 446 intermediate the apertured ends of D-ring 456 is a cylindrical spool 458 which is relieved in the formation of a diametrally reduced center porton 460 and upper and lower flange-forming rims 462, 464, rims 462, 464 being spaced apart a distance slightly greater than the width of band 410.

At their opposite ends, links 438, 442, and 440, 444 are respectively interconnected by pintles 466, 468, which are turned down at their ends in the provision of shoulders 470, 472 and diametrally reduced end portions 474, 476, end portions 474, 476 being countersunk into links 438, 440, and 442, 444 so as to be flush with the outwardly presented surfaces thereof. Shoulders 448, 450 maintain links 438, 440 and 442, 444 in rigid spaced relation to one another. Rotatably mounted on pintles 446, 468 are rollers 478, 480, each having diametrally enlarged end rims 482, 484, which inwardly merge into inwardly tapered shoulders 486, 488, which, in turn, terminate at a diametrally reduced center portion 490. As will be seen by reference to FIGURE 14, center portion 490 engages the outwardly presented edges of track 402 while tapered shoulders 486, 488 ride on the upper and lower converging races 404, 406 of track 402.

Intermediate pintles 446, 466, scissor links 438, 442 are rigidly provided with perpendicularly projecting pins 492, 494, respectively, and similarly intermediate pintles 446, 468, links 440, 444 are provided with pins 496, 498, respectively. Operatively disposed on scissor links 438, 440 is a cross-link 500 having elongated apertures 502, 504, which slidably receive pins 492, 496, respectively, the heads of pins 492, 496 being peened over on top thereof. Similarly, scissor links 442, 444 are interconnected by a cross-link 506 having elongated apertures 508, 510, which slidably accept pins 494, 498, respectively, the heads of pins 494, 498 also being peened over against the outer face of link 506.

Band 410 is trained through roller assemblies 434, 436, as best illustrated in FIGURE 13 for the assembly 434. More particularly, band 410 is drawn out of groove 408 and immediately engaged with the opposed cylindrical surfaces of center portions 490 of rollers 478, 480. Therebetween band 410 is trained around the outwardly presented cylindrical surface of diametrally reduced center portion 460 of spool 458. Thus, roller assemblies 434, 436 are free to roll along track 402 and bridge 414 with rollers 478, 480 in engagement with the outer surfaces thereof. Of course, as runners 434, 436 roll around track 402, the portion of band 410 between rollers 478, 480 will be lifted out of groove 408 and passed around spool 458. Finally, it should be noted that roller assemblies 434, 436 are provided with outwardly projecting tabs 512, 514, which are respectively fastened to the ends of scissor links 438, 444, tabs 512, 514 of roller assemblies 434, 436 being interconnected by an adjustable plastic rope, chain, or other suitable connecting means 516, 518 so that they will always remain in opposed relation to one another around the periphery of track 402.

In use, the tumbling belt 400 is slipped over the gymnast's hips with leg straps 413 engaging the legs and precluding further upward travel of belt 400. At this point, belt 400 is presented somewhat loosely around his waist and is held in place generally by the inner cushion 412. Moreover, when the belt 400 is in the expanded position, so to speak, the links 438, 440 and 442, 444 will be spread somewhat as illustrated in FIGURE 19. It should be noted that in this position pins 492, 494, 496, 498 are located near the outer ends of elongated apertures 502, 504, and 508, 510, which limit the lateral deflection of scissor links 438, 442, and 440, 444, which, in turn, prevent further spreading of rollers 478, 480. Belt 400 is tightened merely by tugging lightly on D-rings 456 which causes the same to move toward the position illustrated in FIGURE 15 wherein band 410 is drawn further through roller assemblies 434, 436, which, in turn, causes the ends of track 402 to slide telescopically toward one another within bridge 414.

The gymnast is free at this point to perform a variety of tumbling exercises as heretofore discussed. The swivel connections of harness snaps 96, 98 permit freedom of rotation about a horizontal axis through belt 400. Moreover, if the gymnast desires to incorporate twists into his tumbling exercises, he may do so without any impedance from belt 400 whatsoever, for when he twists or rotates about the horizontal axis of his torso, roller assemblies 434, 436 will merely travel around the periphery of track 402, being held against it by flexible band 410. If for some reason the gymnast loses his balance and cannot control his fall, the support ropes of the harness at a point during the fall will become taut and thereby exert laterally directed opposed forces on D-rings 456 of roller assemblies 434, 436. These forces will pull spool 458 outwardly thereby causing links 438, 440, and 442, 444 to close, so to speak, bringing rollers 478, 480 close to one another, all as best seen in FIGURE 13. Of course, as rollers 478, 480 approach one another the portion of the band 410 in contact with track 402 is reduced causing the ends of track 402 to slide further into bridge 414, whereupon track 402 and cushion 412 are urged into snug embracement with the gymnast's waist. In other words, when D-rings 456 of roller assemblies 434, 436 are subjected to outwardly directed forces the effective perimetral size of band 410 is reduced which, in turn, bears against and contacts track 402, so to speak, urging the same into snug embracement with the gymnast's waist. Thus, what otherwise might be a hazardous fall is averted and the gymnast is merely left suspended in air by belt 400 and supporting harness structure. In this connection, it should be noted that inner cushion 412 provides a soft contact with the gymnast's body and prevents the track 402 from digging into his waist or ribs.

Belt 400 is easily emplaced about the gymnast's waist inasmuch as there are no bothersome hooks or buckles to manipulate. Moreover, leg straps 413 prevent the belt from riding up over the gymnast's torso. Of course, it will be apparent to anyone skilled in the art that belt 94 can also be provided with leg straps.

While the particular tumbling and twisting belts herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. In belt means for connecting a tumbler to support means including a belt track adapted to snugly embrace a tumbler's waist, connecting means for connecting said belt track to a supporting means for supporting said tumbler at a preselected height above a man-supporting surface and means mounting said connecting means on said belt track for rotation therearound, the improvement comprising:

means preventing relative axial movement between said belt track and said mounting means comprising angulated flanges encompassing and fixedly secured to said belt track, and roller means on said mounting means engaging said flanges for movement around the periphery thereof.

2. An improvement as stated in claim 1 wherein said belt track has two opposed free ends and wherein said belt includes a bridge interconnecting said free ends, said roller means being adapted to move across said bridge.

3. An improvement as stated in claim 2 wherein said free ends are engageable with said bridge at a plurality of locations along said bridge whereby the size of said belt track is optionally adjustable for accommodating waists of varying sizes.

4. An improvement as stated in claim 3 wherein said belt track includes a center portion having an outwardly presented center race and first and second outwardly diverging flanges each having first and second races and free end edges and wherein said roller means comprises two roller assemblies each having a frame, spools rotatably mounted on each frame and having surfaces which engage the center race of said center portion and said first races of said flanges and rollers rotatably carried by each said frame for engaging said second races of said flanges whereby said roller assemblies are free to move about said periphery of said belt track and across said bridge but cannot be withdrawn laterally therefrom.

5. An improvement as stated in claim 4 wherein each of said spools has a diametrally enlarged, substantially cylindrical center portion which engages said center race, diametrally reduced, substantially cylindrical and portions which engage said free end edges of said track and tapered shoulders interposed between said end portions and said center portion, said shoulders being in engagement with said first races of said flanges.

6. An improvement as stated in claim 5 wherein said rollers engage said flanges at positions on said second races substantially opposite the positions on said flanges where the tapered shoulders of said spools engage said first races.

7. An improvement as stated in claim 2 wherein said belt track is provided with an outwardly opening groove and wherein said roller means include a pair of roller assemblies each comprising a spool located in outwardly spaced relation to said belt track, link members pivotally carried for swingable movement about the axis of said spool, and rollers rotatably carried by said link members and being in engagement with said belt track, said belt means including a flexible band fitted in said groove and having a perimetral size which is greater than the perimetral size of said belt track, said band being trained around said spool and over said roller assemblies whereby said roller assemblies are held against the outer surface of said belt track.

8. An improvement as stated in claim 2 wherein said belt track is provided with first and second races and an outwardly opening groove interposed between said races and in which said roller means comprises roller assemblies each including scissor linkages, a spool rotatably carried by said scissor linkages about an axis coincident to the axis of said scissor linkages, and first and second rollers carried by said scissor linkages in inwardly spaced relation from said spool, said rollers being in engagement with said first and second races and being adapted to move toward and away from one another on the scissor linkages, said belt means also including a flexible band fitted in the groove and having a perimetral size which is greater than the perimetral size of said belt means, said band being trained around said spool and in between said rollers so that it is lifted out of the groove immediately beyond the leading roller and fed back into the groove immediately before the trailing roller as the associated roller assembly advances around the periphery of the belt track whereby the roller assemblies are held against the outer surface of the belt track.

9. An improvement as stated in claim 8 wherein said first and second races outwardly converge toward one another and wherein said rollers are provided with tapered shoulders which engage said first and second races.

References Cited

UNITED STATES PATENTS

| 2,496,748 | 2/1950 | Pond | 272—60 |
| 2,725,853 | 12/1955 | Nordheim. | |
| 3,006,645 | 10/1961 | Frazier | 272—60 |
| 3,085,357 | 4/1963 | Nissen et al. | 272—60 |

OTHER REFERENCES

"Die Leibesubungen," a German publication of 1925, pp. 601–604, vol. 24.

ANTON O. OECHSLE, *Primary Examiner.*

ARNOLD W. KRAMER, *Assistant Examiner.*

U.S. Cl. X.R.

272—24